United States Patent
Esbenshade et al.

(10) Patent No.: US 7,947,098 B2
(45) Date of Patent: May 24, 2011

(54) METHOD FOR MANUFACTURING CHEMICAL MECHANICAL POLISHING PAD POLISHING LAYERS HAVING REDUCED GAS INCLUSION DEFECTS

(75) Inventors: John Esbenshade, Clayton, DE (US); Andrew M Geiger, Newark, DE (US); Paul Libbers, Claymont, DE (US); Samuel J November, Newtown, PA (US); Paul J Sacchetti, Warrington, PA (US); Jonathan Tracy, Kennett Square, PA (US); David Verbaro, Cinnaminson, NJ (US); Michael E Watkins, Bear, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 168 days.

(21) Appl. No.: 12/490,009

(22) Filed: Jun. 23, 2009

(65) Prior Publication Data
US 2010/0269416 A1      Oct. 28, 2010

Related U.S. Application Data

(60) Provisional application No. 61/172,810, filed on Apr. 27, 2009.

(51) Int. Cl.
*C09K 3/14*     (2006.01)

(52) U.S. Cl. .......... 51/298; 366/101; 366/102; 366/136; 366/137; 451/59; 451/526; 451/528

(58) Field of Classification Search .......... 366/102
See application file for complete search history.

(56) References Cited

U.S. PATENT DOCUMENTS

| | | | | |
|---|---|---|---|---|
| 2,094,004 A * | 9/1937 | Drake | | 261/87 |
| 2,701,191 A * | 2/1955 | Laliberte | | 51/298 |
| 5,085,443 A | 2/1992 | Richards | | |
| 5,650,619 A * | 7/1997 | Hudson | | 250/302 |
| 5,825,028 A * | 10/1998 | Hudson | | 250/302 |
| 5,931,722 A * | 8/1999 | Ohmi et al. | | 451/271 |
| 6,007,406 A * | 12/1999 | Custer et al. | | 451/36 |
| 6,068,703 A * | 5/2000 | Chen et al. | | 118/715 |
| 6,095,902 A * | 8/2000 | Reinhardt | | 451/36 |
| 6,488,570 B1 * | 12/2002 | James et al. | | 451/36 |
| 7,273,407 B2 * | 9/2007 | Saikin | | 451/6 |
| 7,275,856 B2 | 10/2007 | Koetas et al. | | |
| 7,285,233 B2 * | 10/2007 | Shih et al. | | 264/51 |
| 7,396,497 B2 | 7/2008 | Koetas et al. | | |
| 2003/0003857 A1 * | 1/2003 | Shimagaki et al. | | 451/534 |
| 2004/0053007 A1 * | 3/2004 | Huh et al. | | 428/158 |
| 2004/0096529 A1 * | 5/2004 | Shih et al. | | 425/1 |
| 2004/0118465 A1 * | 6/2004 | Gaydos et al. | | 137/860 |
| 2006/0046064 A1 * | 3/2006 | Halberg et al. | | 428/412 |
| 2006/0099891 A1 * | 5/2006 | Renteln | | 451/57 |
| 2006/0113705 A1 * | 6/2006 | Shih et al. | | 264/255 |
| 2006/0125133 A1 * | 6/2006 | Huh et al. | | 264/41 |
| 2006/0157095 A1 | 7/2006 | Pham | | |
| 2006/0228439 A1 * | 10/2006 | James et al. | | 425/542 |
| 2006/0235136 A1 * | 10/2006 | Working et al. | | 524/496 |
| 2006/0269659 A1 * | 11/2006 | Kweon et al. | | 427/126.1 |
| 2007/0042693 A1 * | 2/2007 | Saikin | | 451/527 |

* cited by examiner

*Primary Examiner* — Jerry Lorengo
*Assistant Examiner* — Ross J Christie
(74) *Attorney, Agent, or Firm* — Thomas S. Deibert

(57) ABSTRACT

A method for manufacturing chemical mechanical polishing pad polishing layers that minimizes entrained gas inclusion defects is provided. Also provided is a mix head assembly for use in the manufacture of chemical mechanical polishing pad polishing layers, wherein inclusions of entrained gas inclusion defects are minimized.

9 Claims, 1 Drawing Sheet

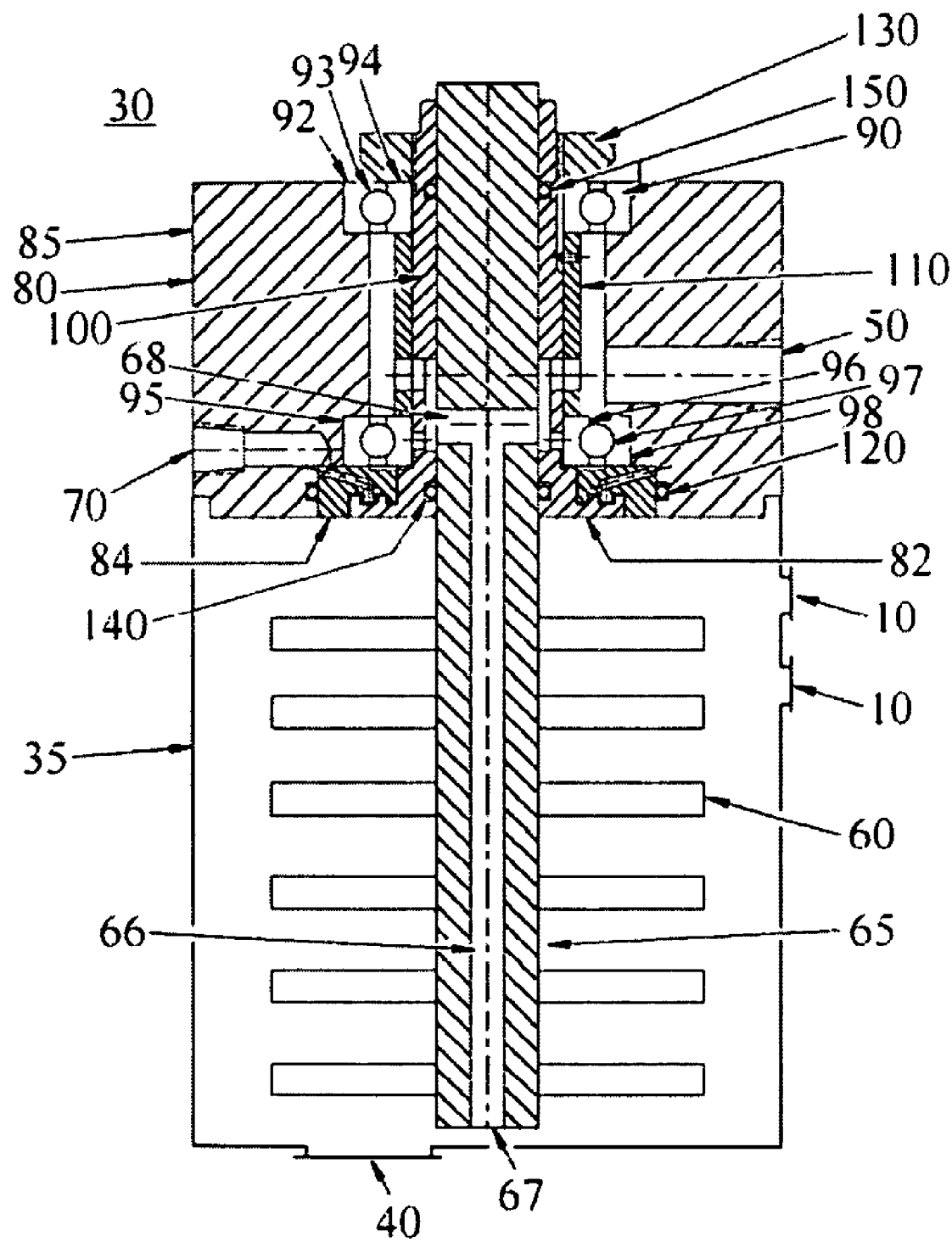

METHOD FOR MANUFACTURING CHEMICAL MECHANICAL POLISHING PAD POLISHING LAYERS HAVING REDUCED GAS INCLUSION DEFECTS

The present invention relates generally to the field of chemical mechanical polishing. In particular, the present invention is directed to a method for manufacturing chemical mechanical polishing pad polishing layers having reduced entrained gas inclusion defects and a mix head assembly for use in the manufacture thereof.

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a chemical composition ("slurry") or other polishing solution is provided between the wafer and the polishing pad. Thus, the wafer surface is polished and made planar by the chemical and mechanical action of the pad surface and slurry.

Reinhardt et al., U.S. Pat. No. 5,578,362, discloses an exemplary polishing pad known in the art. The chemical mechanical polishing pad polishing layer of Reinhardt comprises a polymeric matrix having microspheres dispersed throughout. Generally, the microspheres are blended and mixed with a liquid polymeric material, for example, in a mass flow feed delivery system, and transferred to a mold for curing. The molded article is then cut to form polishing pads. Unfortunately, polishing pad polishing layers formed in this manner may have unwanted entrained gas inclusion defects (i.e., gas bubbles entrained in the polishing pad polishing layer, introducing density variations into the polishing pads).

Entrained gas inclusion defects are the result of incomplete venting of entrained gas from the mixture of polymeric materials prior to introduction into the mold. These entrained gas inclusion defects are unwanted because they may cause unpredictable, and perhaps, detrimental, polishing performance differences from one polishing pad polishing layer to the next. Moreover, these entrained gas inclusion defects may negatively affect polishing performance of a given polishing pad polishing layer during its lifetime (i.e., as surface material is eroded away during polishing and with conditioning of the polishing layer). Prior art manufacturing equipment and methods are inadequate and inefficient for satisfying the ever increasing quality control demands of the CMP industry.

Hence, what is needed is an apparatus and an efficient method of forming a chemical mechanical polishing pad polishing layer having a minimum of gas inclusion defects.

In one aspect of the present invention, there is provided a method of forming a chemical mechanical polishing pad polishing layer, comprising: providing a mold; providing a liquid prepolymer material; providing a plurality of microspheres in an inert carrier gas; providing an inert purge gas; providing a mix head assembly, having a housing with at least one housing inlet and a housing outlet; providing a rotating mixer with a shaft that extends out of the housing; wherein the shaft has a passage therethrough with a shaft passage inlet and a shaft passage outlet to facilitate venting of the inert carrier gas and the inert purge gas from the housing; combining the liquid prepolymer material with the plurality of microspheres in the inert carrier gas in the housing, under the action of the rotating mixer, forming a mixture of liquid prepolymer and microspheres; supplying the inert purge gas to the housing; venting the inert carrier gas and the inert purge gas from the housing through the shaft passage; transferring the mixture of liquid prepolymer and microspheres through the housing outlet to the mold; allowing the mixture of liquid prepolymer and microspheres to solidify in the mold to form a cake; and, deriving a chemical mechanical polishing pad polishing layer from the cake.

In another aspect of the present invention, there is provided a mix head assembly for forming a chemical mechanical polishing pad polishing layer, comprising: a mix head assembly housing having a housing inlet and a housing outlet; a labyrinth seal mounted to the housing, wherein the labyrinth seal comprises: a seal block having an inert purge gas inlet and a gas outlet; an engaging stator fitted to the seal block; an engaging stator o-ring interposed between the seal block and the engaging stator, wherein the engaging stator o-ring secures the engaging stator to the seal block; a rotating mixer having a shaft with a shaft passage, wherein the shaft passage has a passage inlet disposed within the housing and a passage outlet in gas flow communication with the seal block gas outlet; a rotor fitted to the shaft, wherein the rotor engages the engaging stator; a rotor o-ring interposed between the rotor and the shaft, wherein the rotor o-ring secures the rotor to the shaft; a first bearing, having a first bearing outer race, a first bearing inner race and a plurality of first bearing balls interposed between the first bearing outer race and the first bearing inner race; a second bearing, having a second bearing outer race, a second bearing inner race and a plurality of second bearing balls interposed between the second bearing outer race and the second bearing inner race; a shaft sleeve fitted to the shaft; a shaft o-ring interposed between the shaft sleeve and the shaft, wherein the shaft o-ring secures the shaft sleeve to the shaft; and, a bearing nut; a bearing spacer; a liquid prepolymer material; a plurality of microspheres; and, an inert gas; wherein the first bearing outer race is pressed between the seal block and the engaging stator, the second bearing outer race is pressed against the seal block, the second bearing inner race is pressed between the bearing nut and the bearing spacer, and the first bearing inner race is pressed between the bearing spacer and the rotor such that the rotating mixer can rotate relative to the seal block; and, wherein the liquid prepolymer material, the plurality of microspheres and the inert gas are disposed within the housing.

BRIEF DESCRIPTION OF THE DRAWING

The drawing illustrates a cut away, elevational view of a mix head assembly of the present invention.

DETAILED DESCRIPTION

The term "entrained gas inclusion defect" as used herein and in the appended claims refers to void spaces within a chemical mechanical polishing pad polishing layer that are not contained within a microsphere (e.g., within an Expancel particle).

The drawing provides a depiction of a preferred mix head assembly 30 of the present invention. In particular, the drawing depicts a mix head assembly comprising of a mix head assembly housing 35 that has at least one raw material feed inlet 10 for receiving a liquid prepolymer material feed and a feed of microspheres in an inert carrier gas. Optionally, the feed of liquid prepolymer material and the feed of microspheres in an inert carrier gas are feed into the housing through a single inlet 10, for example in a concentric feed configuration. Optionally, the feed of liquid prepolymer material and the feed of microspheres in an inert carrier gas are feed into the housing through separate inlets 10. The mix head assembly housing 35 also has a housing outlet 40 through which a product stream of liquid prepolymer material having microspheres dispersed therein is produced.

The mix head assembly further comprises a labyrinth seal 80 that is mounted to the mix head assembly housing 35. Preferably, the labyrinth seal 80 is a radial labyrinth seal. The labyrinth seal 80 comprises a seal block 85 having an inert purge gas inlet 70 and a gas outlet 50. The radial labyrinth seal 80 also comprises an engaging stator 84 that is fitted to the seal block 85. An engaging stator o-ring 120 is interposed between the seal block 85 and the engaging stator 84. The engaging stator o-ring functions to secure the engaging stator 84 to the seal block 85.

The mix head assembly further comprises a rotating mixer 60. The rotating mixer 60 has a shaft 65 with a shaft passage 66. The shaft passage 66 extends from a passage inlet 67 to a passage outlet 68. When assembled in the mix head assembly, the passage inlet 67 is disposed within the housing 35 and the passage outlet 68 is in gas flow communication with the seal block gas outlet 50.

The mix head assembly further comprises a rotor 82 fitted to the shaft 65. The rotor 82 slidably engages the engaging stator 84. Preferably, the average gap between the rotor 82 and the engaging stator 84 is 0.300 to 0.450 mm; more preferably 0.330 to 0.430 mm; most preferably 0.360 to 0.410 mm. A rotor o-ring 140 is interposed between the rotor 82 and the shaft 65. The rotor o-ring 140 functions to secure the rotor 82 to the shaft 65.

The mix head assembly further comprises at least one bearing. Preferably, the at least one bearing is a sealed bearing. Preferably, the mix head assembly further comprises a first bearing 95 and a second bearing 90. The first bearing 95 and the second bearing 90 are preferably in coaxial alignment with each other and are spaced apart along the shaft 65. The first bearing 95 has a first bearing outer race 98, a first bearing inner race 96 and a plurality of first bearing balls 97, wherein the plurality of first bearing balls 97 are interposed between the first bearing outer race 98 and the first bearing inner race 96 such that the first bearing inner race 96 can rotate on an axis relative to the first bearing outer race 98. The second bearing 90 has a second bearing outer race 92, a second bearing inner race 94 and a plurality of second bearing balls 93, wherein the plurality of second bearing balls 93 are interposed between the second bearing outer race 92 and the second bearing inner race 94 such that the second bearing inner race 94 can rotate on an axis relative to the second bearing outer race 92.

In a preferred mix head assembly 30 configuration, the first bearing 95 and the second bearing 90 are incorporated into the mix head assembly 30 using a bearing nut 130, a shaft sleeve 100 and a bearing spacer 110. The shaft sleeve 100 is fitted to the shaft 65. A shaft o-ring 150 is interposed between the shaft sleeve 100 and the shaft 65. The shaft o-ring 150 functions to secure the shaft sleeve 100 to the shaft 65. The bearing spacer 110 slips over the shaft sleeve 100. The first bearing 95 is configured in the mix head assembly 30 such that the first bearing inner race 96 is mated to the rotor 82 fixed to the shaft 65, wherein the first bearing inner race 96 is interposed between the rotor 82 and the bearing spacer 110. The first bearing outer race 98 is mated to the seal block 85 and the engaging stator 84. The second bearing 90 is configured in the mix head assembly 30 such that the second bearing outer race 92 is mated to the seal block 85. The second bearing inner race 94 is mated to the shaft sleeve 100 and interposed between the bearing spacer 110 and the bearing nut 130. Preferably, the bearing nut 130 is a locknut that resists loosening during use of the mix head assembly. Alternatively, the bearing nut 130 may be locked in place to resist or prevent loosening during use of the mix head assembly using, for example, an adhesive (e.g., Loctite®), a pin arrangement (e.g., cotter pin, split pin), a jam nut, a locking washer (e.g., a split washer, a belleville washer). In this configuration, the rotating mixer 60 is free to rotate relative to the seal block 85.

During use to manufacture chemical mechanical polishing pad polishing layers, the mix head assembly further comprises a liquid prepolymer material (not shown in the drawing), a plurality of microspheres (not shown in the drawing) and an inert gas (not shown in the drawing) all disposed within the mix head assembly housing 35. The liquid prepolymer material, the plurality of microspheres and the inert gas are subjected to agitation in the mix head assembly housing 35 from the rotating mixer 60. The liquid prepolymer material and the plurality of microspheres mix together in the mix head assembly housing 35, while the inert gas (a combination of an inert carrier gas and an inert purge gas) is vented out of the mix head assembly housing 35 through the shaft passage 67 and the mix head assembly gas outlet 50.

During the manufacture of chemical mechanical polishing pad polishing layers comprising a plurality of microspheres, it is useful to fluidize the plurality of microspheres in an inert gas to facilitate transport of the plurality of microspheres between vessels. To ensure consistent and accurate additions of microspheres to prepolymer material, it is important to have a consistent fluidized density of microspheres. Those skilled in the art will recognize that there is an optimum fluidized density of microspheres to facilitate transport between vessels. Those of ordinary skill in the art will also recognize that increasing the volume of carrier gas in the fluidized plurality of microspheres beyond the optimum fluidized density can result in processing difficulties (transferring of the materials from one vessel to another can be hindered if the concentration of carrier gas is too high). Also increasing the volume of carrier gas in the fluidized plurality of microspheres is not believed to be beneficial for reducing entrained gas inclusion defects. To the contrary, an increased volume of carrier gas in the fluidized plurality of microspheres is believed likely to increase the incidence of entrained gas inclusion defects.

It has been surprisingly found that the addition of an inert purge gas into the mix head assembly housing during mixing of liquid prepolymer and fluidized microspheres improves the efficiency of the extraction of inert gas from the mix head assembly housing such that unwanted entrained gas inclusion defects in the chemical mechanical polishing pad polishing layers formed from the combined liquid prepolymer and fluidized microspheres are minimized. Preferably, the inert purge gas is added to the mix head assembly housing in the vapor space adjacent to the labyrinth seal. Most preferably, the inert purge gas is introduced through the interstitial space between the engaging stator and the rotor into the mix head assembly housing. Under the action of the rotating mixer, a vortex is formed around the shaft. Without wishing to be bound by theory, it is believed that the flow of inert purge gas into the mix head assembly housing helps to stabilize the vortex formed around the shaft such that venting from the mix head assembly housing through the shaft passage is enhanced.

In some embodiments of the present invention, the method of forming a chemical mechanical polishing pad polishing layer, comprises: providing a mold; providing a liquid prepolymer material; providing a plurality of microspheres in an inert carrier gas; providing an inert purge gas; providing a mix head assembly, having a housing with a housing inlet and a housing outlet; providing a rotating mixer with a shaft that extends out of the housing, a driver that rotates the rotating mixer; wherein the shaft has a passage therethrough with a shaft inlet and a shaft outlet to facilitate venting of the inert carrier gas and the inert purge gas from the housing; combining the liquid prepolymer material with the plurality of microspheres in the inert carrier gas in the housing, under the action of the rotating mixer, forming a mixture of liquid prepolymer and microspheres; supplying the inert purge gas to the housing; venting the inert carrier gas and the inert purge gas from the housing through the shaft passage; transferring the mixture of liquid prepolymer and microspheres through the housing outlet to the mold; allowing the mixture of liquid prepolymer and microspheres to solidify in the mold to form a cake; and, deriving a chemical mechanical polishing pad polishing layer from the cake. Preferably, the rotating mixer is rotated at 1,000 to 10,000 rpm; more preferably 2,500 to 6,000; most preferably 3,000 to 4,000 rpm. Preferably, the inert purge gas is supplied to the housing through a seal associated with the rotating mixer shaft at a flow rate of 200 to 30,000 cm$^3$/min., more preferably 1,000 to 20,000 cm$^3$/min., most preferably 3,000 to 14,000 cm$^3$/min. Preferably, the cake produced using the method of the present invention contain fewer entrained gas inclusion defects compared to a cake produced using the same process but without providing the inert purge gas. Most preferably, the cake produced using the method of the present invention contain at least 20% fewer entrained gas inclusion defects compared to a cake produced using the same process but without providing the inert purge gas. Most preferably, the cake produced using the method of the present invention contain at least 50% fewer entrained gas inclusion defects compared to a cake produced using the same process but without providing the inert purge gas. In some aspects of these embodiments, the method optionally further comprises slicing the cake into a plurality of chemical mechanical polishing pad polishing layers.

In some embodiments of the present invention, the method of forming a chemical mechanical polishing pad polishing layer, comprises: providing a mold; providing a liquid prepolymer material; providing a plurality of microspheres in an inert carrier gas; providing an inert purge gas; providing a mix head assembly, having a housing with at least one housing inlet (preferably with at least two inlets) and a housing outlet; providing a rotating mixer with a shaft that extends out of the housing, a driver that rotates the rotating mixer; wherein the shaft has a passage therethrough with a shaft inlet and a shaft outlet to facilitate venting of the inert carrier gas and the inert purge gas from the housing; providing a labyrinth seal, wherein the labyrinth seal is interfaced with the housing and wherein the shaft extends through the labyrinth seal; feeding the inert purge gas through the labyrinth seal into the housing; combining the liquid prepolymer material with the plurality of microspheres in the inert carrier gas in the housing, under the action of the rotating mixer, forming a mixture of liquid prepolymer and microspheres; supplying the inert purge gas to the housing; venting the inert carrier gas and the inert purge gas from the housing through the shaft passage; transferring the mixture of liquid prepolymer and microspheres through the housing outlet to the mold; allowing the mixture of liquid prepolymer and microspheres to solidify in the mold to form a cake; and, deriving a chemical mechanical polishing pad polishing layer from the cake. Preferably, the rotating mixer is rotated at 1,000 to 10,000 rpm; more preferably 2,500 to 6,000; most preferably 3,000 to 4,000 rpm. Preferably, the inert purge gas is supplied to the housing through a seal associated with the rotating mixer shaft at a flow rate of 200 to 30,000 cm$^3$/min., more preferably 1,000 to 20,000 cm$^3$/min., most preferably 3,000 to 14,000 cm$^3$/min. Preferably, the cake produced using the method of the present invention contain fewer entrained gas inclusion defects compared to a cake produced using the same process but without providing the inert purge gas. Most preferably, the cake produced using the method of the present invention contain at least 20% fewer entrained gas inclusion defects compared to a cake produced using the same process but without providing the inert purge gas. Most preferably, the cake produced using the method of the present invention contain at least 50% fewer entrained gas inclusion defects compared to a cake produced using the same process but without providing the inert purge gas. Preferably, the labyrinth seal is a radial labyrinth seal. Preferred radial labyrinth seals for use with the present invention comprises a rotor secured to the shaft, an engaging stator secured to a seal block and at least one bearing with an outer race stationary with the seal block and an inner race stationary with the shaft. In some aspects of these embodiments, the method optionally further comprises slicing the cake into a plurality of chemical mechanical polishing pad polishing layers.

Liquid prepolymer material used with the present invention is preferably a polyisocyanate-containing material. More preferably, the reaction product of a polyisocyanate (e.g., diisocyanate) and a hydroxyl-containing material. Preferred polyisocyanates include, for example, methylene bis 4,4'-cyclohexyl-isocyanate; cyclohexyl diisocyanate; isophorone diisocyanate; hexamethylene diisocyanate; propylene-1,2-dissocyanate; tetramethylene-1,4-diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of hexamethylene diisocyanate; triisocyanate of 2,4,4-trimethyl-1,6-hexane diisocyanate; urtdione of hexamethylene diisocyanate; ethylene diisocyanate; 2,2,4-trimethylhexamethylene diisocyanate; 2,4,4-tri-methylhexamethylene diisocyanate; dicyclohexylmethane diisocyanate; and combinations thereof. The most preferred polyisocyanates are aliphatic and have less than 14 percent unreacted isocyanate groups.

The hydroxyl-containing material used with the present invention is preferably a polyol. Exemplary polyols include, for example, polyether polyols, hydroxy-terminated polybutadiene (including partially and fully hydrogenated derivatives), polyester polyols, polycaprolactone polyols, polycarbonate polyols, and mixtures thereof.

Preferred polyols include polyether polyols. Examples of polyether polyols include polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone; diethylene glycol initiated polycaprolactone; trimethylol propane initiated polycaprolactone; neopentyl glycol initiated polycaprolactone; 1,4-butanediol-initiated polycaprolactone; PTMEG-initiated polycaprolactone; and mixtures thereof. The hydrocarbon chain can have saturated or unsaturated bonds, or substituted or unsubstituted aromatic and cyclic groups. Suitable polycarbonates include, but are not limited to, polyphthalate carbonate and poly(hexamethylene carbonate) glycol.

Microspheres suitable for use with the present invention include polymeric microspheres, such as, polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin and combinations thereof (e.g., Expancel™ from Akzo Nobel of Sundsvall, Sweden). The microspheres can be chemically modified to change the solubility, swelling and other properties by branching, blocking, and crosslinking, for example. Preferably, the microspheres have a mean diameter that is less than 150 µm, and more preferably a mean diameter of less than 50 µm. Most Preferably, the microspheres 48 have a mean diameter that is less than 15 µm. Note, the mean diameter of the microspheres can be varied and different sizes or mixtures of different microspheres 48 can be used. A most preferred material for the microsphere is a copolymer of acrylonitrile and vinylidene chloride.

The liquid prepolymer material further comprises a curing agent. Curing agents can be selected from diamines. Suitable polydiamines include both primary and secondary amines. Preferred polydiamines include, but are not limited to, diethyl toluene diamine ("DETDA"); 3,5-dimethylthio-2,4-toluenediamine and isomers thereof; 3,5-diethyltoluene-2,4-diamine and isomers thereof (e.g., 3,5-diethyltoluene-2,6-diamine); 4,4'-bis-(sec-butylamino)-diphenylmethane; 1,4-bis-(sec-butylamino)-benzene; 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); methylene-bis 2-chloroaniline ("MBOCA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane, 2,2',3,3'-tetrachloro diamino diphenylmethane; trimethylene glycol di-p-aminobenzoate; and mixtures thereof. Preferably, the curing agent is selected from 3,5-dimethylthio-2,4-toluenediamine and isomers thereof.

Curing agents can also include diols, triols, tetraols and hydroxy-terminated curatives. Suitable diols, triols, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(beta-hydroxyethyl)ether; hydroquinone-di-(beta-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; and mixtures thereof.

The hydroxy-terminated and diamine curatives can include one or more saturated, unsaturated, aromatic, and cyclic groups. Additionally, the hydroxy-terminated and diamine curatives can include one or more halogen groups.

Mixtures of curing agents can be used.

Any inert gas can be used as the inert carrier gas in the method of the present invention provided that it does not react with, or otherwise interfere with, the prepolymer material and the microspheres. Preferably, the inert carrier gas is carbon dioxide.

Any inert gas can be used as the inert purge gas in the method of the present invention provided that it does not react with, or otherwise interfere with, the prepolymer material and the microspheres. Preferably, the inert purge gas is carbon dioxide.

We claim:

1. A method of forming a chemical mechanical polishing pad polishing layer, comprising:
   providing a mold;
   providing a liquid prepolymer material;
   providing a plurality of microspheres in an inert carrier gas;
   providing an inert purge gas;
   providing a mix head assembly, having a housing with at least one housing inlet and a housing outlet; a seal interfaced with the housing; and a rotating mixer with a shaft; wherein the rotating mixer is disposed within the housing; wherein the shaft extends out of the housing through the seal; and wherein the shaft has a passage therethrough with a shaft passage inlet and a shaft passage outlet to facilitate venting of the inert carrier gas and the inert purge gas out of the housing through the shaft passage;
   combining the liquid prepolymer material with the plurality of microspheres in the inert carrier gas in the housing, under the action of the rotating mixer, forming a mixture of liquid prepolymer and microspheres;
   supplying the inert purge gas to the housing;
   venting the inert carrier gas and the inert purge gas from the housing through the shaft passage;
   transferring the mixture of liquid prepolymer and microspheres through the housing outlet to the mold;
   allowing the mixture of liquid prepolymer and microspheres to solidify into a cake in the mold; and,
   deriving a chemical mechanical polishing pad polishing layer from the cake.

2. The method of claim 1, wherein the liquid prepolymer material comprises a polyisocyanate-containing material.

3. The method of claim 2, wherein the liquid prepolymer material further comprises a curing agent.

4. The method of claim 1, wherein the seal is a labyrinth seal; further comprising:
   feeding the inert purge gas through the labyrinth seal into the housing.

5. The method of claim 4, wherein the labyrinth seal is a radial labyrinth seal.

6. The method of claim 1, further comprising:
   slicing the cake into a plurality of chemical mechanical polishing pad polishing layers.

7. The method of claim 1, wherein the cake contains fewer entrained gas inclusion defects compared to a cake manufactured by the same process without providing the inert purge gas.

8. The method of claim 1, wherein the inert carrier gas is carbon dioxide.

9. The method of claim 1, wherein the inert purge gas is carbon dioxide.

* * * * *